United States Patent [19]

Desjardins

[11] 4,140,028
[45] Feb. 20, 1979

[54] VIBRATION ISOLATION SYSTEM

[75] Inventor: Rene A. Desjardins, Media, Pa.

[73] Assignee: The Boeing Company, Seattle, Wash.

[21] Appl. No.: 832,966

[22] Filed: Sep. 13, 1977

[51] Int. Cl.$^2$ .............. F16F 15/10; B64C 27/00; A47G 29/00
[52] U.S. Cl. .................... 74/574; 180/1 R; 244/17.27; 248/564; 280/688
[58] Field of Search ............. 74/574; 244/17.27; 248/20; 280/124; 267/20; 180/1 R

[56] References Cited

U.S. PATENT DOCUMENTS

| | | | |
|---|---|---|---|
| 1,486,763 | 3/1924 | Joubert | 180/1 R |
| 2,744,749 | 5/1956 | Fiedor | 267/20 R |
| 2,833,552 | 5/1958 | Polhemus | 280/124 |
| 3,322,379 | 5/1967 | Flannely | 248/20 |
| 3,552,694 | 1/1971 | Flanely | 248/20 |
| 3,698,663 | 10/1972 | Balke et al. | 244/17.27 |
| 3,845,917 | 11/1974 | Drees | 244/17.27 |
| 3,857,534 | 12/1974 | Drees | 244/17.27 |
| 3,858,831 | 1/1975 | Halwes | 244/17.27 |
| 4,088,042 | 5/1978 | Desjardins et al. | 244/17.27 X |

OTHER PUBLICATIONS

"Development of the Kinematic Focal Isolation System for Helicopter Rotors" by Balke in 'The Shock & Vibrator Bulletin,' Nov. 1968.
"Nodalization Applied to Helicopter" by Shipman Bell Helicopter Co., Division of Textron, Inc.

Primary Examiner—Leonard H. Gerin
Attorney, Agent, or Firm—Finnegan, Henderson, Farabow & Garrett

[57] ABSTRACT

A vibration isolation system wherein a vibrating mass such as a helicopter rotor-transmission assembly is spring coupled to a body to be isolated, such as the helicopter fuselage, at a plurality of coupling locations. Each coupling location includes a weighted lever arm pivotally connected to the vibrating mass and to the body and a coupling spring connected to the weighted lever arm for transmitting the rotor forces of the rotor-transmission assembly to the fuselage through the pivot connections on the lever arm. The coupling spring is in the form of an elongated spring arm connected at one end to the weighted lever arm and at the other end to the body through a pivot link, the latter being required to accommodate shortening of the spring during flexure. The spring forces transmitted to the fuselage through the coupling springs due to linear vibration forces are cancelled at the characteristic rotor frequency by equal and opposite inertial forces produced by the weighted lever arms. A modified system is disclosed wherein spring forces transmitted to the fuselage due to angular as well as linear vibration forces are isolated. In this system a second coupling spring is added to the basic spring arm arrangement such that the second spring flexes only in response to either the linear or angular vibratory component, but not to both. This causes the spring forces applied to the fuselage in response to angular vibration to be different from the spring forces applied due to linear vibration and this difference in spring forces establishes moment as well as linear force equilibrium such that the fuselage is completely isolated from angular as well as linear vibration.

26 Claims, 24 Drawing Figures

LINEAR FORCING

*Fig. 16*

ANGULAR FORCING

VIBRATION ISOLATION SYSTEM

FIELD OF THE INVENTION

This invention pertains to vibration isolation systems and, more particularly, to the type of vibration isolation systems wherein inertia forces set up by vibration-induced motion of an auxiliary mass are applied to cancel vibratory forces in a predetermined frequency range.

BACKGROUND OF THE INVENTION

A vibration isolation system of the type hereinafter described is disclosed in copending patent application Ser. No. 720,601 filed Sep. 7, 1976 by R. A. Desjardins, C. W. Ellis, and V. Sankewitsch entitled "Vibration Isolation System", now U.S. Pat. No. 4,088,042. The vibration isolation apparatus there disclosed involves a mechanism for coupling the vibrating mass to the body to be isolated, such apparatus employing a pair of torsion coupling springs and a plurality of relatively complex, difficult to manufacture parts. It is known that in operation of an isolation system incorporating such apparatus, while linear (vertical) vibration forces are suitably eliminated, moments about a horizontal axis are not completely isolated and undesirable vibrations can in some conditions be coupled into the body by such unisolated moments.

OBJECTS AND SUMMARY OF THE INVENTION

It is therefore an object of the present invention to provide an improved vibration isolation system.

It is an additional object of the invention to provide an improved vibration isolation system of the dynamic antiresonant type having simple construction involving a minimum number of parts, whereby low cost manufacture and highly reliable operation is achieved.

Another object is to provide an improved vibration isolation system of the type described in which complete isolation of all vibratory force components, linear as well as angular, is attained.

To achieve the foregoing objects and in accordance with a first aspect of the invention, apparatus is provided for coupling a body to a vibrating mass with minimum transmission of vibration forces therebetween, such apparatus employing a weighted lever arm, first pivot means connecting the vibrating mass to the lever arm about a first pivot axis, second pivot means connecting the body to the lever arm about a second pivot axis displaced along the lever arm from the first pivot axis, one of the pivot axes being located substantially at a first end of the lever arm.

There is further provided spring arm means joined at one end to the first end of the lever arm and connected at the other end to a point of attachment anchored to the body such that the direction of flexure of the spring arm means produced by pivot motion of the lever arm means is parallel to the pivot plane of the lever arm. This arrangement provides isolation of the body from vibratory forces of a predetermined frequency because the inertial forces imposed by the lever arm on the body through the second pivot means in response to motion of the vibratory mass at such predetermined frequency are substantially equal and opposite to the spring forces imposed on the body by flexure of the spring arm means.

In accordance with a second aspect of the invention, a system is provided for isolating a body from both linear and angular vibration forces generated by a vibrating mass coupled thereto, such system including a pair of weighted lever arms coupling the vibrating mass to the body about two pivot axes on the latter, the lever arms being pivotally connected to the vibrating mass and operating in response to the vibration forces to apply inertial forces to the body at the pivot axes.

In accordance with this aspect of the invention, there is further provided spring means for transmitting the vibration forces to the body through points displaced from the aforesaid two pivot axes, the spring means being constructed and arranged to operate with a first spring rate in response to linear vibration forces and to operate with a different spring rate in response to angular vibration forces such that the spring forces applied to the body in response to linear vibration are different from the spring forces applied in response to angular vibration, the difference between such forces operating to equalize the imbalance of moments acting on said body during the latter vibration mode due to the displacement between said two pivot axes and said spring force transmission points, whereby the body is isolated from angular vibration forces as well as linear forces produced at a predetermined vibration frequency.

The accompanying drawings which are incorporated in and constitute a part of this specification, illustrate preferred embodiments of the invention and together with the description, serve to explain the principles of the invention.

DETAILED DESCRIPTION OF THE EMBODIMENTS

Figure 1:
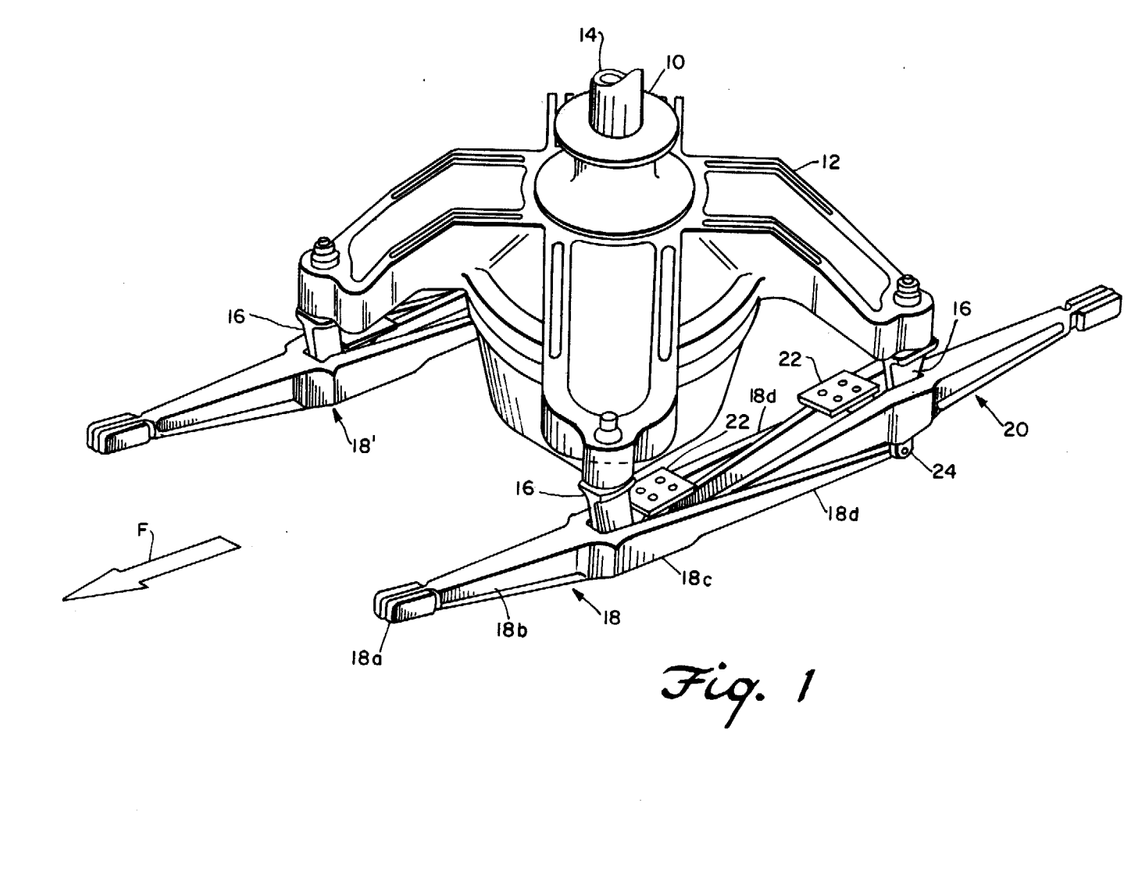
FIG. 1 is a perspective view showing the rotor-transmission assembly of a helicopter, which constitutes a vibrating mass, and a system of weighted lever arms and associated spring arms which cooperate to isolate the helicopter body (not shown) from vibratory forces in accordance with a first preferred embodiment of the invention.

Referring to FIG. 1, the rotor and transmission assembly 10 of a helicopter is shown together with its mounting frame 12. A rotor shaft 14 extends vertically from the top of the transmission and supports the rotor assembly (not shown) in the usual fashion. The drive motor and drive shaft coupling it to the transmission are mounted behind the transmission assembly and are not shown. Arrow F denotes the normal forward direction of helicopter motion.

Mounting frame 12 is secured to the helicopter fuselage by a set of four transmission mounting brackets 16 which are pivotally connected to a set of four vibration isolation lever arm and spring assemblies 18, 20, 18', and 20' (the latter not shown). The latter are pivotally connected to the fuselage by a set of four fuselage mounting brackets 22. The brackets 22 are bolted to right angle brackets (not shown) fastened to the sides of the upper fuselage frame.

The lever arm and spring assemblies 18, 20 are identical to the assemblies 18', 20'. As shown for the left forward assembly 18, it includes a weighted lever arm having tuning weights 18a, a rigid arm portion 18b, and a bifurcated end section 18c. Elongated flex spring members 18d are integrally connected to the weighted lever arm and extend from the bifurcated end section 18c thereof. First and second pivot pins are provided for coupling the transmission mounting bracket 16 and the fuselage mounting bracket 22, respectively, to bifurcated section 18c of the lever arm.

In general, operation of the vibration isolation apparatus is as follows. As the rotor-transmission assembly vibrates vertically at the characteristic n/rev. rotor frequency, n being the number of rotor blades, the four legs of the mounting frame 12 vibrate up and down in phase at the characteristic frequency. The linear vertical vibratory forces thus applied to the lever arms 18, 20, 18' and 20' cause the arms to pivot about the axes established by the fuselage pivot pins connected to mounting brackets 22 under constraint of the flex spring members connected to the weighted lever arms. The ends of each of the flex springs are anchored through pivot links, such as link 24, to the fuselage pivot pin associated with the opposite lever arm and spring assembly. Flexure of the springs transmits vertical load and vibration forces via the transmission pivot pins and these forces are applied to the fuselage through the fuselage pivot points. Vibratory forces are cancelled out at the characteristic rotor frequency by equal and opposite inertial forces generated by displacement of the weighted lever arms. These inertial forces, which are applied to the fuselage pivots pins, therefore operate to isolate the helicopter fuselage from the vertical vibratory forces generated by the rotor-transmission assembly.

Figure 2:
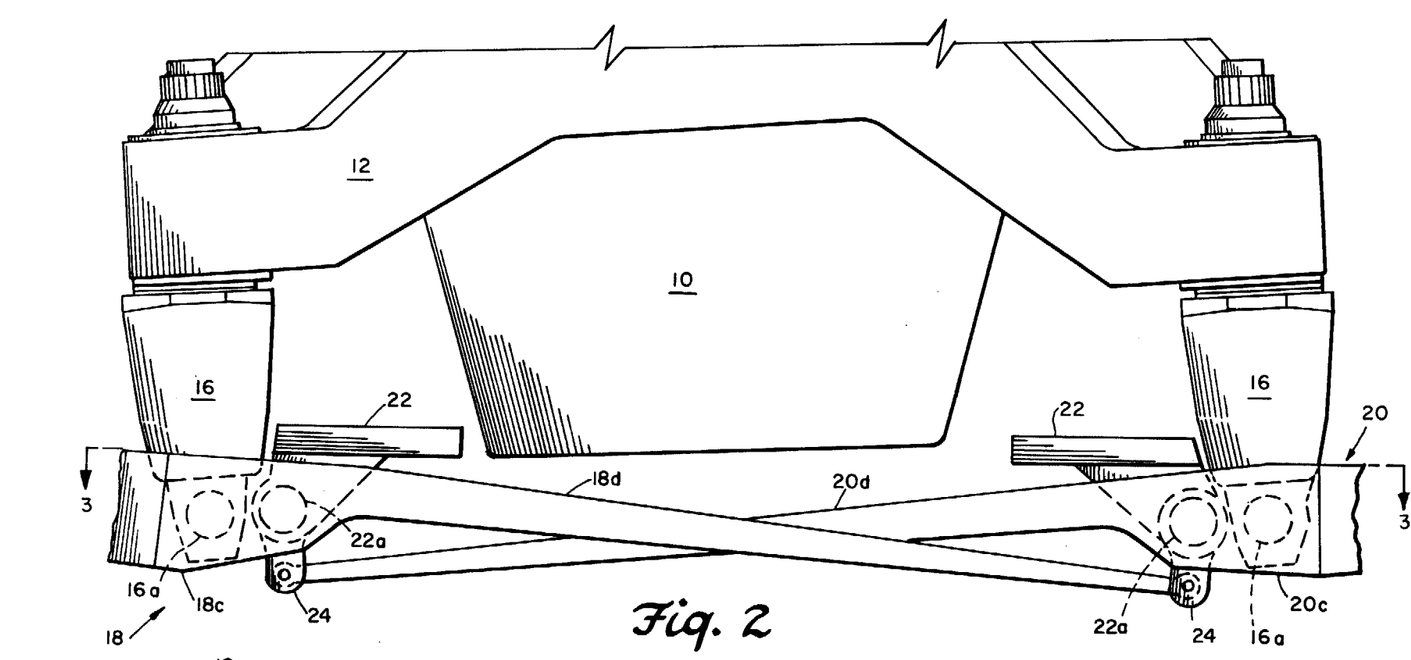
FIG. 2 is a side elevation view of the apparatus shown in FIG. 1 and illustrates the details of the pivot means employed for coupling the vibratory mass and fuselage body to the weighted lever arms of the isolation apparatus.
Figure 3:
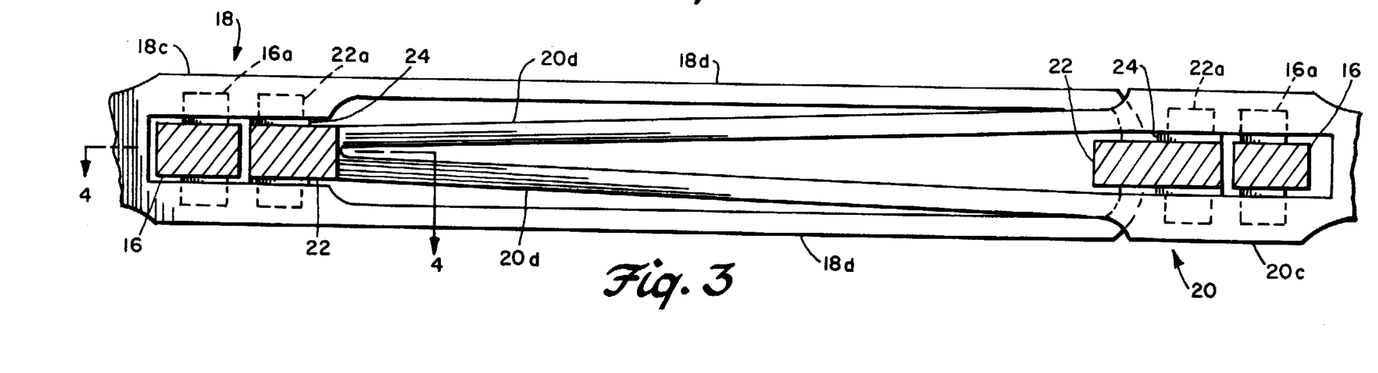
FIG. 3 is a sectional view of the vibration isolation apparatus taken along line 3—3 of FIG. 2.

FIGS. 2 and 3 show the lever arm and flex spring assemblies 18 and 20 and their pivot mounting arrangements in greater detail. Each of the transmission mounting brackets 16 has a transverse pivot pin 16a located at its lower end. The pivot pin 16a is secured rigidly, such as by a press fit, in the bracket 16 so that the pin does not rotate relative to the bracket. In similar fashion, each of the fuselage mounting brackets 22 has a transverse pivot pin 22a mounted at its lower end.

Pivot pins 16a and 22a are journaled in the parallel arms of the bifurcated end sections 18c and 20c of the weighted lever arms. A pair of pivot links 24 are pivotally mounted on the fuselage pivot pins 22a and are pinned to the free ends of the springs 18d and 20d. As shown in FIG. 3, the spring arms 18d and 20d each comprise a pair of elongated flex spring arms extending from the parallel side portions of the bifurcated end sections of the respective lever arms. Spring arms 18d run parallel to one another for substantially their full length while spring arms 20d converge at an acute angle.

This construction permits the cris-cross arrangement shown in FIG. 2, spring arms 20d passing through the space between spring arms 18d. This arrangement provides for a more compact construction, the point of maximum flexure of the arms occurring at essentially the cross-over point.

Figure 4:
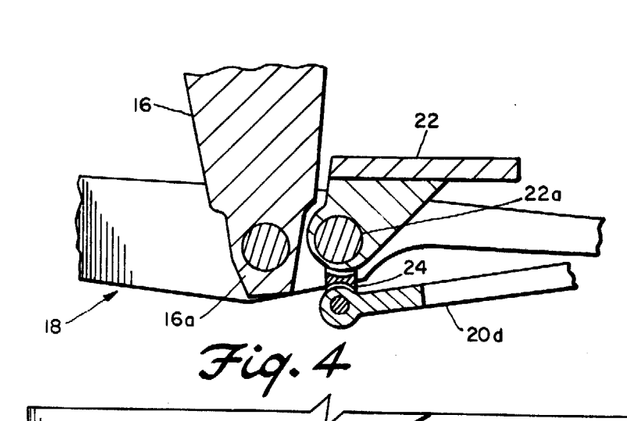
FIG. 4 is a sectional view taken along line 4—4 of FIG. 3 and illustrates the left-hand coupling pivots and pivot link assemblies.
Figure 5:
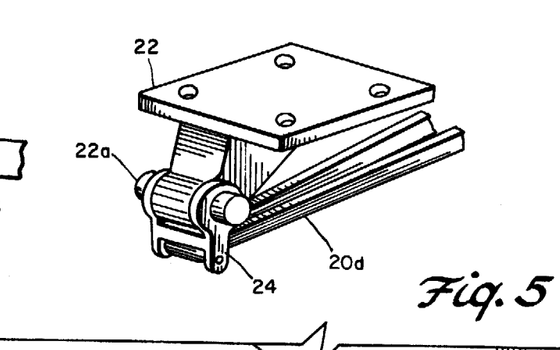
FIG. 5 is a perspective view of the portion of the apparatus shown in FIG. 4 including the body mounting bracket, body pivot pin, pivot link, and attached spring arm member.

FIG. 4 is a section taken through the center of the pivot assembly and more clearly shows the inter-relationship between the lever arm, mounting brackets 16 and 22, pivot pins 16a and 22a, and pivot link 24. FIG. 5 shows in perspective the portion of the assembly including mounting brackets 22, pivot pin 22a, pivot link 24, and the end portion of spring arms 20d. It thus can be seen from FIGS. 4 and 5 that the free end of each of the spring arms is pivotally anchored to the fuselage pivot pin 22a by means of the pivot link 24. This construction is required to accommodate shortening of the spring arms which occurs during flexure thereof in response to vibratory and steady load forces. Alternatively, the links 24 can be eliminated by providing a right-angle offset portion at the ends of the lever arms, which offset portion is pivotally secured to the pins 22a. This provides sufficient lateral resiliency in the spring arms to accommodate foreshortening without the need for pivot links.

Figure 6:
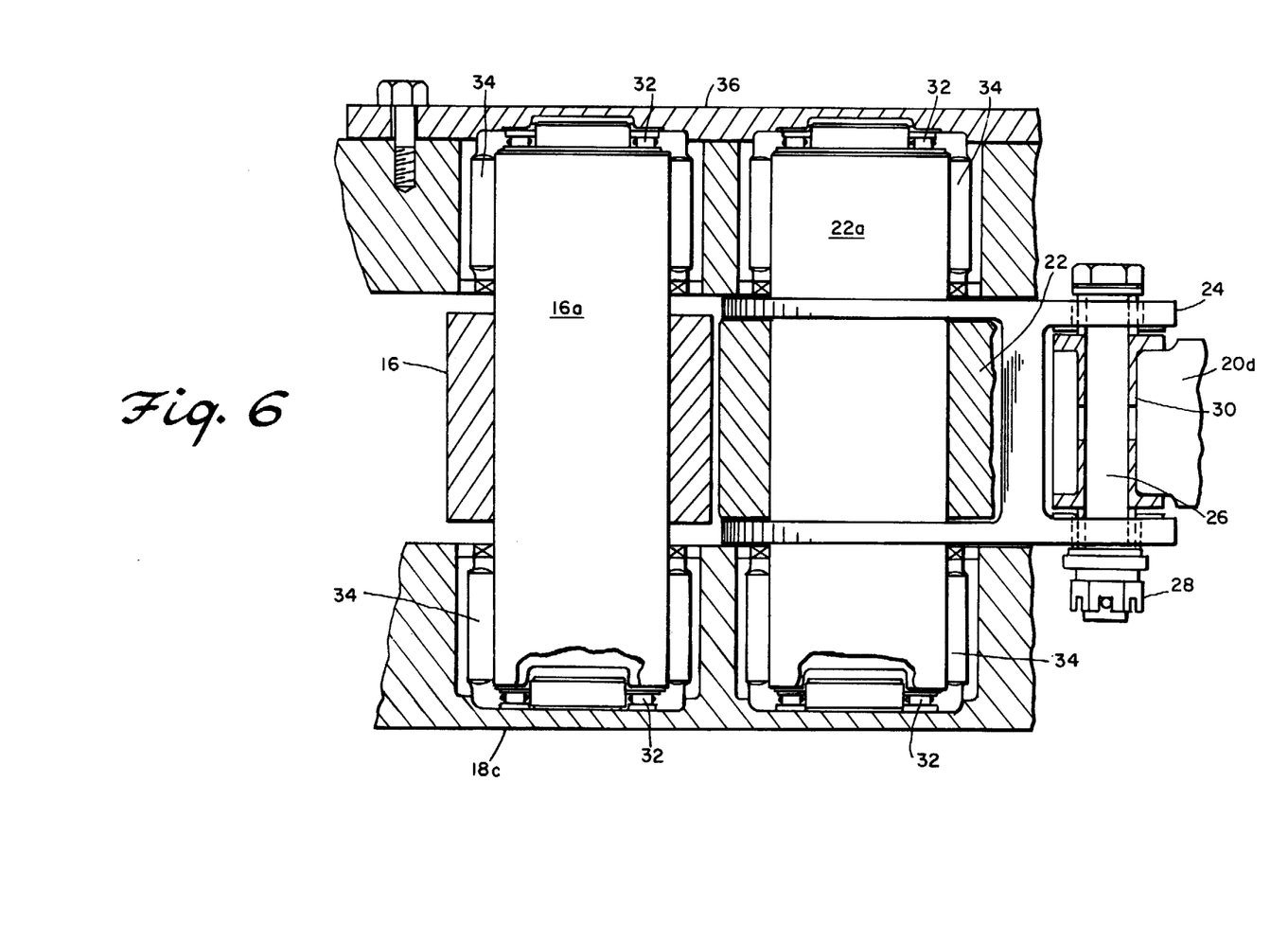
FIG. 6 is a partially sectioned view showing the details of a preferred construction of the portion of the lever arm housing the pivot pins and pivot link assemblies.

FIG. 6 shows a horizontal section taken through the center of the bifurcated end section 18c of the lever arm and discloses the details of the pivot assembly. The pivot pins 16a and 22a are mounted for pivot motion by a set of roller bearings 34. Thrust bearings 32 are provided at the ends of the pivot pins. A cap 36 is provided on one side of the lever arm to enable assembly and disassembly of the unit. The end of spring arm 20d is pivotally attached to the pivot link 24 by an appropriate bolt 26, threaded fastener 28 and bushing 30. The link assembly is shown rotated ninety degrees for clarity.

Figure 7:
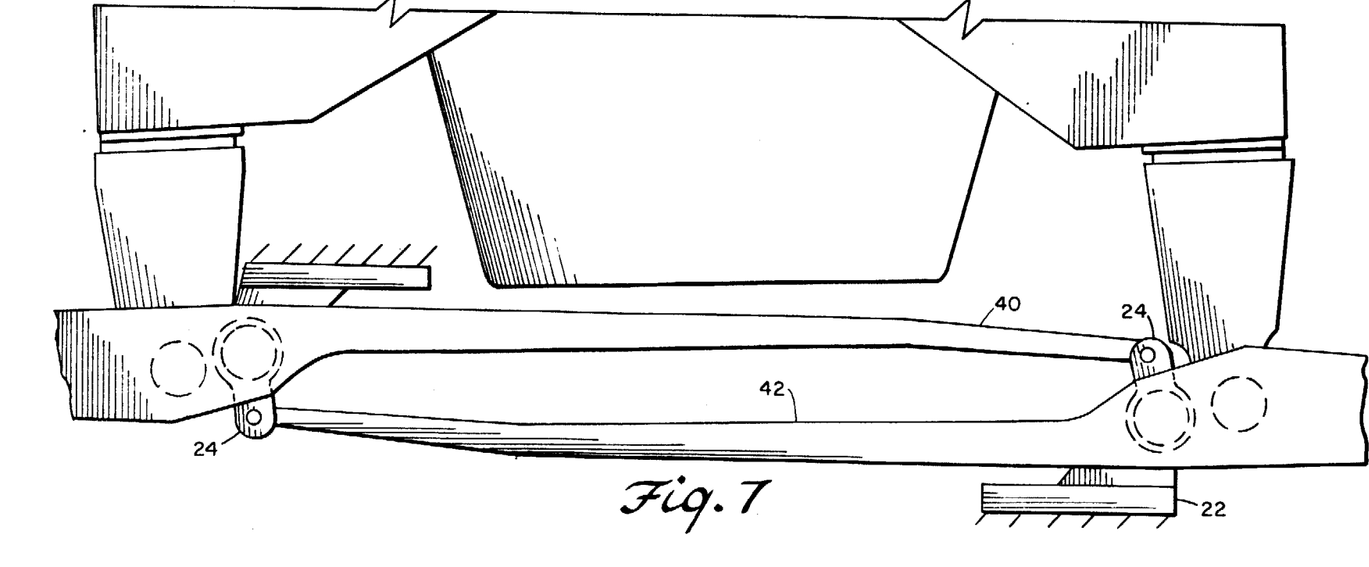
FIG. 7 is a side elevation view, partially cut away, of a second preferred embodiment of the vibration isolation apparatus of the invention.

FIG. 7 shows an alternative form of vibration isolation assembly in that the flex springs 40 and 42 attached to the lever arms are mounted substantially parallel to one another rather than in the cris-cross fashion described above. As shown in FIG. 7, the pivot links 24 extend in opposite directions away from the pivot pins on which they are mounted and, to facilitate this arrangement, the position of the right-hand (rear) fuselage mounting bracket 22 has been reversed. This configuration enables use of identically constructed lever arm and spring assemblies and both may be similar to either of the assemblies 18 or 20 described above. Functionally, the arrangement shown in FIG. 7 is identical to that described in connection with FIGS. 1–6.

Figure 8:
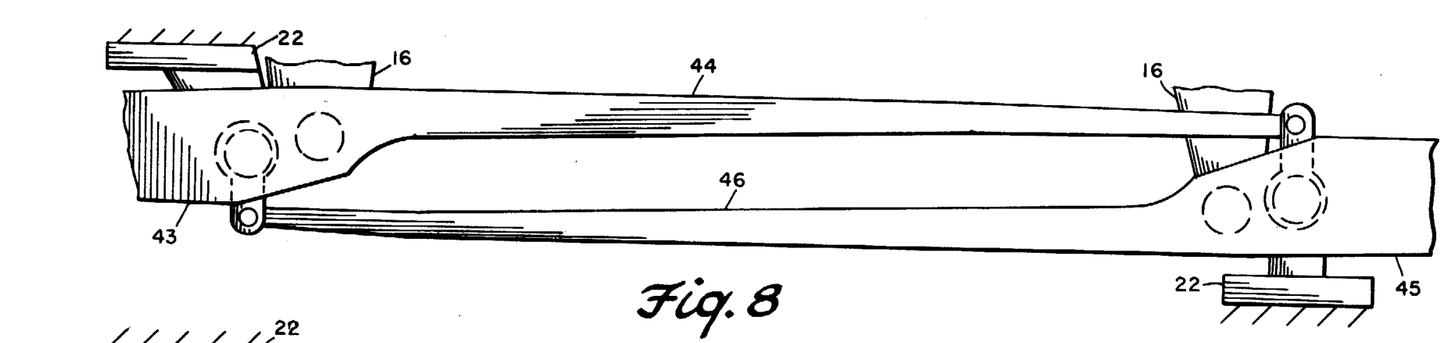
FIG. 8 is a side elevation view of a third preferred embodiment of the vibration isolation apparatus of the invention.

FIG. 8 shows a third preferred embodiment of the invention. The arrangement of the lever arms 43, 45 and associated spring arms 44, 46 is similar to that shown in FIG. 7 in that the springs 44 and 46 are mounted essentially parallel to one another. However, in the FIG. 8 arrangement it is noted that the transmission mounting brackets 16 are located within the spacing between the fuselage mounting brackets 22 so that the distance between the transmission pivot axes is less than, and included within, the distance between the fuselage pivot axes. Spring arm 44 is preferably configured like the arms 18d of FIG. 3 so that the right-hand transmission bracket 16 fits between the parallel side portions thereof.

Figures 9, 10:
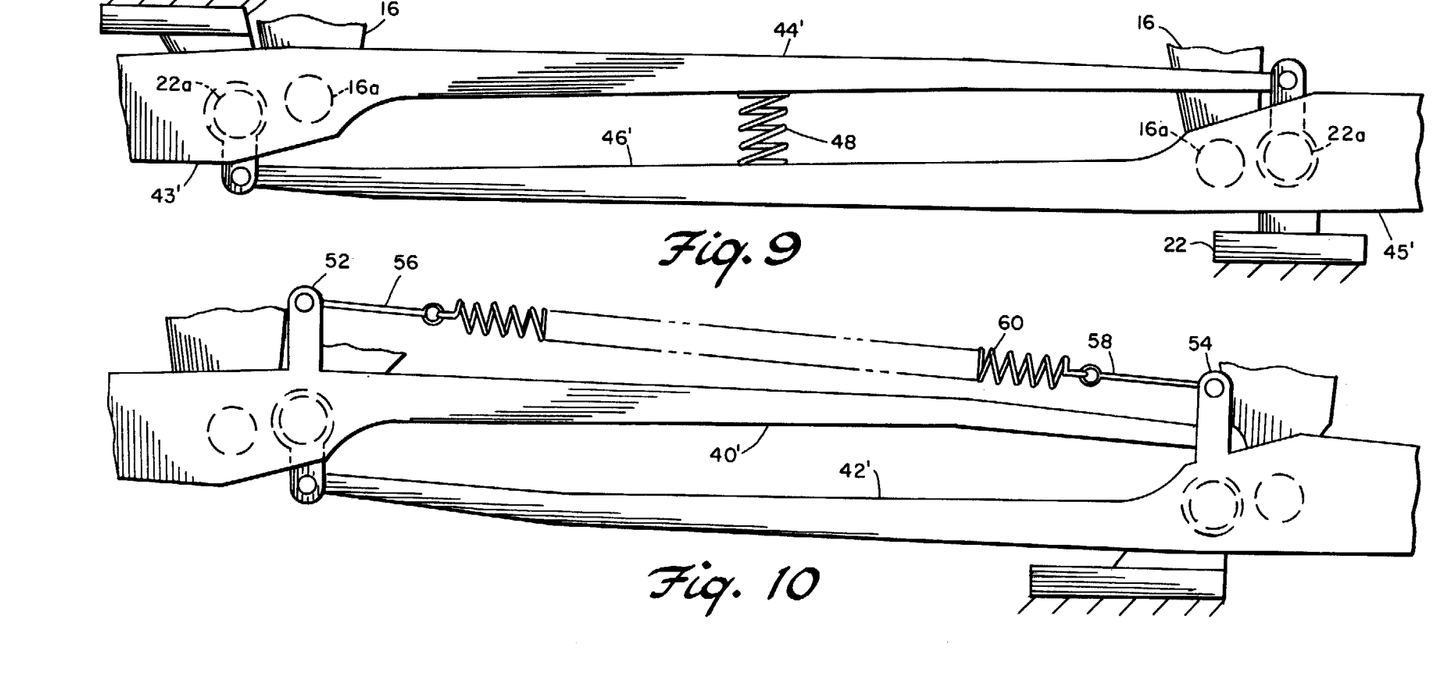
FIG. 9 is a side elevation view of a fourth preferred embodiment of the vibration isolation apparatus of the invention, this embodiment including secondary spring means for altering the spring rate to provide cancellation of moments coupled into the fuselage by angular vibration about the pitch axis of the helicopter.
FIG. 10 is a side elevation view showing a fifth preferred embodiment of the vibration isolation apparatus of the invention, this embodiment also including secondary spring means for cancelling moments induced by angular vibration about the pitch axis.

FIGS. 9 and 10 illustrate further embodiments of the invention in which a secondary spring is employed to change the spring rate operable in response to angular and linear vibration forces.

As will be described hereinafter in the discussion relating to the operation of these systems, it is known that with a dynamic antiresonant isolator of the type herein described, angular vibration forces applied by the vibrating mass can couple unisolated moments into the fuselage. As used herein, "angular vibration forces" are the forces which result from angular displacement of the vibrating mass. In this mode of vibration substantially linear forces are applied to the fuselage through the pivot axes established by pivot pins 22a but these forces are 180° out of phase with one another. For example, looking at FIG. 9, when the rotor-transmission assembly vibrates in a purely angular mode about the pitch axis, the transmission mounting brackets 16 are displaced in opposite directions by equal amounts. That is, when the left-hand bracket 16 is displaced in a downward direction, the right-hand bracket 16 is displaced an equal amount in the upward direction and vice versa.

With the type of apparatus described herein, the vibration forces are applied at points (pins 16a) which are displaced from the points (pins 22a) at which the opposing inertial forces are applied. Because of this displacement between the force application points, certain angular vibration forces can couple moments into the fuselage which cannot be fully cancelled out by the inertial forces generated by the lever arms. Such unisolated moments result in the application of equal and opposite linear vibration forces at the fuselage pivots which can be of sufficient magnitude to cause undesirable effects.

Accordingly, the embodiments illustrated in FIGS. 9 and 10 incorporate secondary spring means to cause the basic spring rate of the system to be different in response to angular vibration than it is in response to linear vibration. The arrangement shown in FIG. 9 utilizes a compression spring 48 mounted between the parallel spring arms 44' and 46'. In responding to linear vibration, where the transmission mounting brackets 16 are displaced in phase with each other, the weighted lever arms 43' and 45' pivot in opposite angular directions and spring arms 44' and 46' remain essentially parallel to one another throughout the flexure cycle. Under these conditions spring 48 is not flexed and the spring rate thereof does not alter the basic spring rate of the system.

However, during angular vibration the spring arms 44' and 46' are displaced toward and away from each other, whereupon spring 48 undergoes flexure and the spring rate of that spring adds to the basic spring rate of the system. This causes the forces applied by flexure of the springs to the fuselage through pivot pins 16a and 22a to be greater than in the linear vibration mode and for reasons to be described subsequently, application of the higher spring-generated vibratory forces during angular vibration cancels out the unisolated moments and provides complete linear as well as angular vibration isolation.

The embodiment illustrated in FIG. 10 is the same as that shown in FIG. 9 except that the fuselage and transmission pivot axes have been reversed and the secondary spring 60 is a tension spring mounted between two crank arms 52 and 54. The spring 60 contributes to the spring rate of the system only in response to linear vibration and not in response to angular vibration. This is because in responding to linear vibratory forces the lever arms are displaced in opposite angular directions and spring 60 is caused to flex while in responding to angular vibration forces the lever arms are displaced in the same angular direction and spring 60 does not flex. Thus, the spring rate of the system is greater for linear vibration than it is for angular vibration and the lower spring forces applied to the fuselage in the latter mode of operation cause complete isolation of moments as well as linear forces, as will be described hereinafter.

OPERATION

Figure 11A:
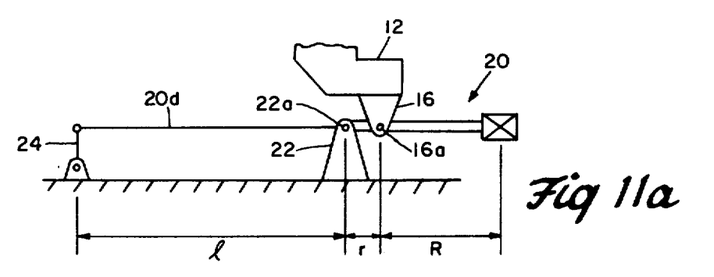
FIGS. 11a and 11b are schematic diagrams illustrating the components of the right-hand half of the isolation apparatus shown in FIG. 2 and FIG. 7, FIG. 11b illustrating a dynamically equivalent configuration employing a linear rather than a flex beam type of coupling spring.

Operation of the basic system illustrated in the embodiments of FIGS. 1–8 is hereinafter described in connection with FIGS. 11–13. FIG. 11a schematically illustrates the righthand lever arm and spring assembly 20 for the systems illustrated in FIGS. 1-7 wherein the transmission pivot axes are outside the fuselage pivot axes.

Spring arm 20d flexes in the manner of a cantilever spring as the transmission frame 12 is displaced vertically in response to vibratory forces. The stiffness of spring 20d is represented by EI where E is the modulus of elasticity of the spring material and I is the cross-sectional moment of inertia of the spring. A flex-beam type of spring such as spring 20d can be replaced by a linear spring in an equivalent arrangement as shown in FIG. 11b.

The spring constant $K_{ve}$ of the equivalent linear spring can be shown to be equal to:

$$K_{ve} = \frac{3EI}{lr^2}$$

This calculation of the equivalent spring constant assumes, for purposes of simplification, that the spring 20d has a constant stiffness along its full length. In practice, it may be desired to utilize a tapered spring to reduce weight, the design of a tapered spring of equal stiffness being well within the skill of the art.

Figure 11B:
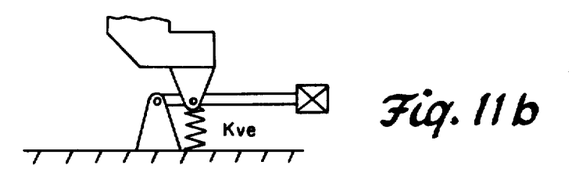
Figure 13:
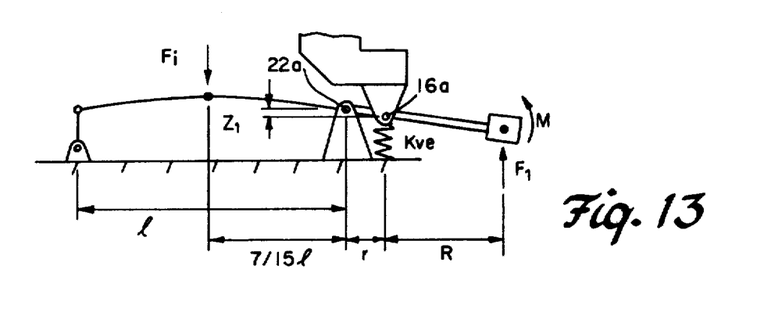
FIG. 13 is a schematic diagram defining the dimensional parameters and the inertial force components of the apparatus illustrated in FIGS. 11a and 11b.

FIG. 13 illustrates the forces involved in a dynamic analysis of the apparatus shown in FIGS. 11a and 11b and enables development of the tuning equation for the system. In designing a given system, the parameters of the system must be adjusted so that at the fuselage pivot 22a the inertia forces developed by the lever arm in response to linear vibratory displacement are equal and opposite to the vibratory forces developed through the spring for a given vibration frequency. When the system is so designed, the fuselage undergoes zero displacement in response to linear vibratory forces. Assuming a displacement $Z_1$ (FIG. 13) the vibratory force applied to pivot point 16a through flexure of the spring is equal to:

$$K_{ve} Z_1$$

Inertia forces developed by displacement of the lever arm mass, including the mass of the attached spring arm, are equal to:

$$F_1 \frac{R}{r} + M \frac{1}{r} + \frac{8}{15} F_i$$

The inertia force components $F_1$, M and $F_i$ are calculated as follows:

$$F_1 = m_1 \omega^2 Z_1 \left( \frac{R - r}{r} \right)$$

$$M = \frac{I \omega^2 Z_1}{r}$$

$$F_i = \omega^2 \frac{l}{8r} m_s Z_l$$

where
 $\omega$ = frequency of vibration
 $m_1$ = mass of the weighted lever arm
 $I$ = moment of inertia of the weighted lever arm
 $m_s$ = mass of the spring arm The tuning equation is defined by setting the spring force equal to the inertia force as follows:

$$K_{ve} Z_1 = m_1 \omega^2 Z_1 \left( \frac{R - r}{r} \right) \frac{R}{r} + \frac{I \omega^2 Z_1}{r} \frac{1}{r} + \frac{8}{15} \omega^2 \frac{l}{8r} m_s Z_1$$

Solving for $\omega^2$:

$$\omega^2 = \frac{K_{ve}}{m_1 \left( \frac{R}{r} - 1 \right) \frac{R}{r} + \frac{I}{r^2} + \frac{lm_s}{15r}} \quad (1)$$

Using equation (1) and knowing the characteristic vibration frequency $\omega$ for a particular helicopter system, the mass, geometry and spring rate parameters of the system can be readily selected to provide antiresonance, and thus essentially complete isolation of linear vibration forces, at the characteristic vibration frequency.

Figure 12A:
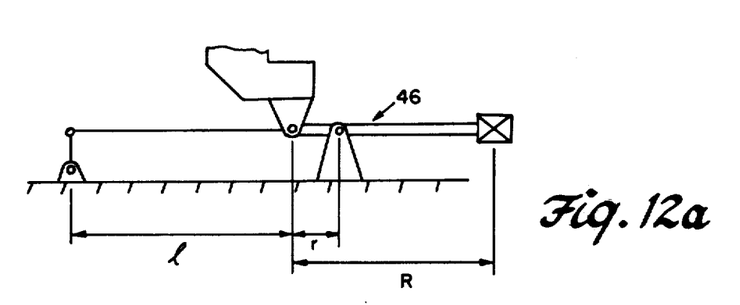
FIGS. 12a and 12b are similar schematic diagrams for the embodiment shown in FIG. 8.
Figure 12B:
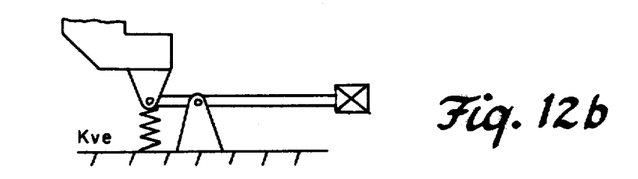

FIGS. 12a and 12b schematically illustrate the type of isolation apparatus wherein the transmission pivots are positioned within the spacing between the fuselage pivots as is illustrated in the embodiment of FIG. 8. The parameters l, r and R are defined in FIG. 12a and the spring rate $K_{ve}$ for the linear spring equivalent to the flex-beam spring illustrated is calculated as follows:

$$K_{ve} = \frac{3EI(l + r)^2}{l^3 r^2}$$

The tuning equation for this system is:

$$\omega^2 = \frac{K_{ve}}{m_1 \left( 1 + \frac{R}{r} \right) \frac{R}{r} + \frac{I}{r^2} + \frac{lm_s}{15r}} \quad (2)$$

Figure 14A:
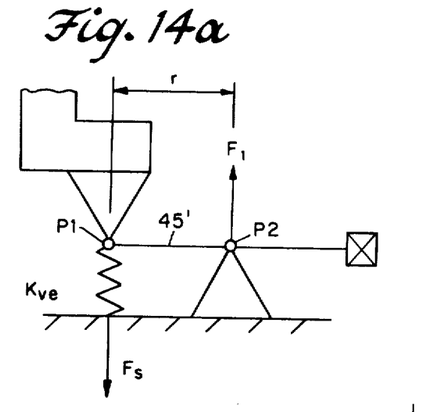
FIGS. 14a and 14b are schematic diagrams illustrating the manner in which vibration forces are transmitted from the vibrating mass to the helicopter body through the spring and pivot arm arrangement of the invention.

Turning to the embodiment described above in connection with FIG. 9, operation thereof is hereinafter described with reference to FIGS. 14-18. In FIG. 14a the right-hand lever arm 45' and spring 46' are represented schematically with an equivalent linear spring being substituted for the flex-beam spring arm. The equivalent spring is positioned below the transmission pivot P1 and transmits a linear spring force $F_s$ to the fuselage body (cross-hatched surface) when the transmission is displaced downwardly by rotor forces. The weighted lever arm 45' applies an equal and opposite inertial force $F_1$ to the fuselage pivot P2 in response to motion of the lever arm at the characteristic frequency in accordance with equation (2).

Figure 14B:
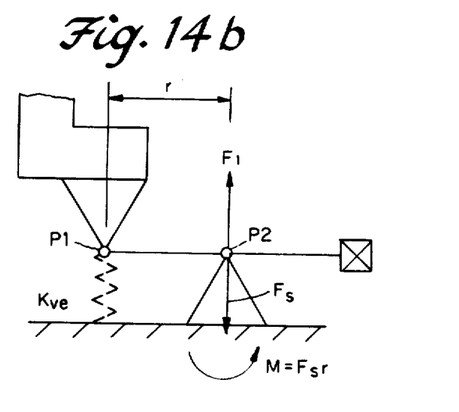

However, since the equivalent spring $K_{ve}$ is not actually present in the system, the spring force $F_s$ is actually applied through the fuselage pivot P2 as shown in FIGS. 14b. Thus because the spring force is translated through the moment arm r in the actual system, the fuselage not only receives the linear force $F_s$ but also receives a moment $M = F_s r$.

Figure 15:
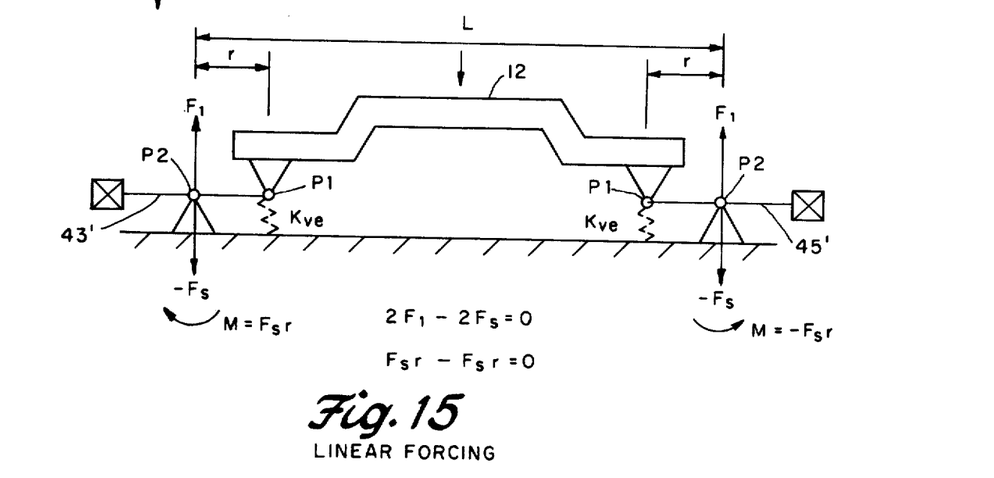
FIG. 15 is a schematic diagram showing the forces applied to the body through pivots P2 for the case of linear forcing in an arrangement of the type shown in FIG. 8.

The two level arm assemblies 43' and 45' and their associated springs are shown in FIG. 15. In response to downward linear vibratory displacement of the rotor-transmission assembly 12 negative (downward) spring forces $-F_s$ are applied to the two body pivots P2 and equal and opposite inertial forces $F_1$ are generated by the lever arms to balance the spring forces. Notice that the positive (clockwise) moment $M = F_s r$ applied on the left is balanced by the equal negative (counterclockwise) moment $-F_s r$ applied on the right hand and, as shown by the force equations given in FIG. 15, the body is completely isolated from the linear rotor vibration forces.

Figure 16:
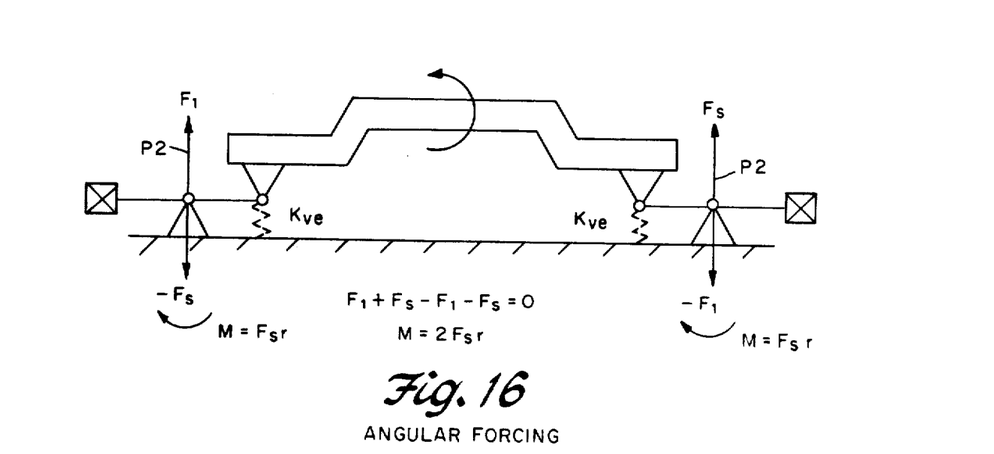
FIG. 16 is a schematic diagram similar to FIG. 15 showing the forces applied to the body for the case of angular forcing about the pitch axis.

FIG. 16, however, demonstrates that complete isolation is not provided for angular vibration forces if the latter are applied solely through the main spring arms (represented by the equivalent linear springs $K_{w}$). In the case of counterclockwise angular vibratory displacement of the rotor-transmission assembly 12 (as illustrated in FIG. 16), the spring forces $F_s$ are applied in opposite directions, i.e., negative on the left and positive on the right. Similarly, the applied inertial forces $F_1$ are positive on the left and negative on the right. Notice, however, that the moments $F_s r$ are both positive. Thus, while the basic linear $F_s$ and $F_1$ forces are still in equilibrium, an unisolated positive moment $2 F_s r$ is present and this manifests itself as a pair of equal and opposite forces $F_s 2r/L$ applied to the pivots P2 (since the unisolated moment is positive for the case shown a positive force $F_s 2r/L$ is applied to the left pivot and a negative force $-F_s 2r/L$ is applied to the right pivot). The direction of these forces of course reverses on each half vibration cycle resulting in unisolated vibration forces applied to the fuselage.

It is to be understood that the forces depicted in the diagrams are vibratory forces only and do not include the effects of static loading. In a typical helicopter system the static loads applied by the weight of the fuselage and payload which is suspended from the lift module will apply a static load to the lever arm and spring assemblies such that the total spring forces will actually be much greater than depicted by the vectors shown. In fact, the total spring forces will almost always be directed upward when the helicopter is in flight. However, the spring force vectors will fluctuate above and below the static "neutral" load value as a result of the applied vibratory forces and hence the vibratory spring force vectors $F_s$ are shown as either up or down (positive or negative). The inertia forces $F_1$, of course, oppose only the vibratory force vectors $F_s$ so that at antiresonance the total spring force remains substantially constant at the static load value.

Figure 17:
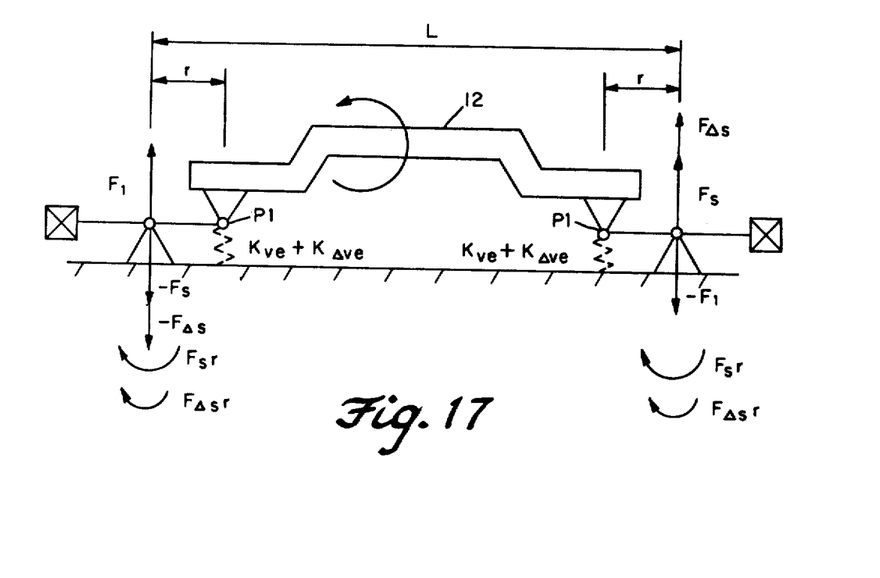
FIGS. 17 and 18 are schematic diagrams demonstrating the application of forces to the body when a secondary spring, such as shown in FIG. 9, is utilized to alter the spring rate for angular vibration to isolate the body from moments as well as linear forces.
Figure 18:
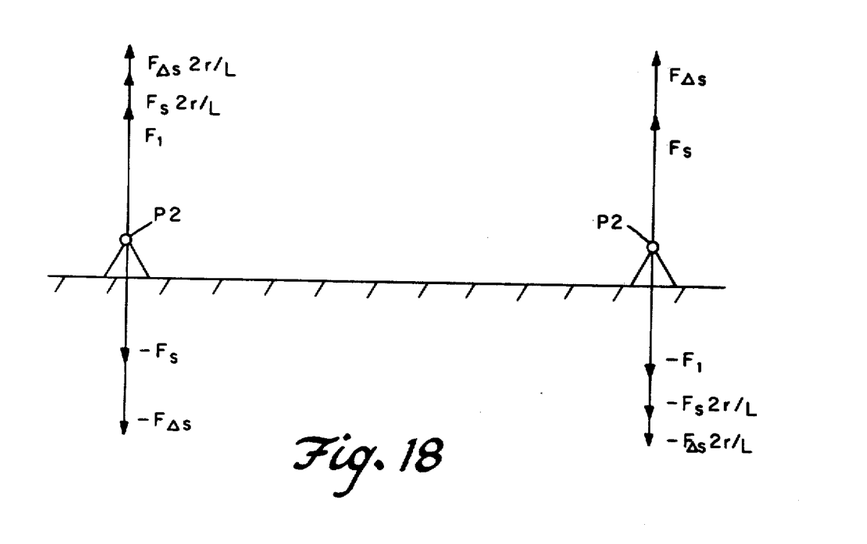

FIGS. 17 and 18 illustrate the manner in which the secondary spring 48 (FIG. 9) operates to provide complete isolation for all vibratory forces in the angular vibration mode. As shown in FIG. 17 the equivalent spring operating in the case of angular vibration has a spring rate of $K_w + K_{\Delta w}$, the latter being the spring constant for the secondary spring 48. Thus in the case of negative (counterclockwise) angular displacement of the rotor-transmission assembly 12, the forces applied at the left pivot include the inertia force $F_1$ (which is the same as in the previous cases shown in FIGS. 15 and 16), the spring force $-F_s$ contributed by $K_w$ for the main spring arm, the spring force $-F_{\Delta s}$ contributed by $K_{\Delta w}$ for the secondary spring, and two positive moments $F_s r$ and $F_{66 s} r$ due to the spring forces.

At the right pivot the $F_1$, $F_s$ and $F_{\Delta s}$ forces are reversed but the moments $F_s r$ and $F_{\Delta s} r$ are also positive. However, note that the total linear spring force components $|F_s + F_{\Delta s}|$ applied at each pivot are greater than the inertia forces $|F_1|$ such that the $\pm F_{\Delta s}$ vectors together contribute a negative moment to the system. By proper selection of $F_{\Delta s}$ this negative moment can be made to balance the total positive moment $2 F_s r + 2 F_{\Delta s} r$ generated due to the translation of the spring forces through the moment arms r whereupon total isolation for angular as well as linear vibration forces is achieved.

The value of $F_{\Delta s}$ can be calculated by setting up a force balance equation in terms of $F_s$ and $F_{\Delta s}$ and solving for the latter. The force balance equation is set up by converting the $F_s r$ and $F_{\Delta s} r$ moments to their equivalent linear force components at the P2 pivots, as shown in FIG. 18. The $F_s r$ moments appear at the pivots as a force couple $\pm F_s 2r/L$ which is applied in the positive direction on the left and in the negative direction on the right. The $F_{\Delta s} r$ moments are resolved into a similarly applied force couple $\pm F_{\Delta s} 2r/L$.

The resultant force R applied to the left pivot is thus:

$$R = F_1 - F_s + F_s 2r/L + F_{\Delta s} 2r/L - F_{\Delta s}$$

Since it is known from tuning equation (2) that $F_1 = F_s$ this reduces to:

$$R = F_s 2r/L + F_{\Delta s} 2r/L - F_{\Delta s}$$

Setting $R = 0$ (the desired condition of equilibrium at the pivot) and solving for $F_{\Delta s}$:

$$F_{\Delta s} - \frac{F_{\Delta s} 2r}{L} = \frac{F_s 2r}{L}$$

$$F_{\Delta s}\left(1 - \frac{2r}{L}\right) = \frac{F_s 2r}{L}$$

$$F_{\Delta s} = \frac{\frac{F_s 2r}{L}}{1 - \frac{2r}{L}} = \frac{F_s 2r}{L} \cdot \frac{L}{L - 2r}$$

$$F_{\Delta s} = \frac{F_s 2r}{L - 2r} = \frac{F_s 2r}{\left(\frac{L}{2r} - 1\right)2r} = \frac{F_s}{\frac{L}{2r} - 1} \qquad (3)$$

Since the spring forces $F_s$ and $F_{\Delta s}$ are proportional to the respective spring constants, the equivalent spring constant $K_{\Delta w}$ for the secondary spring 48 is, from equation (3):

$$K_{\Delta w} = \frac{K_w}{\frac{L}{2r} - 1}$$

Given the geometry of the system as shown in FIG. 9, where L is the distance between fuselage pivots 22a, r is the distance between pivot 22a and its adjacent pivot 16a, and the spring 48 is located midway between the transmission pivots 16a, the actual linear spring constant for the spring 48 is:

$$K_\Delta = \frac{2 K_w}{\frac{L}{2r} - 1}\left(\frac{r}{L - 2r}\right)^2$$

Operation of the system of FIG. 10 is hereinafter described with reference to FIGS. 19-21. As previously described, the secondary spring 60 operates in tension and flexes only in response to applied linear vibration forces. In the angular vibration mode, only the basic spring arms 40' and 42' transmit the vibration forces to the fuselage.

Figure 19:
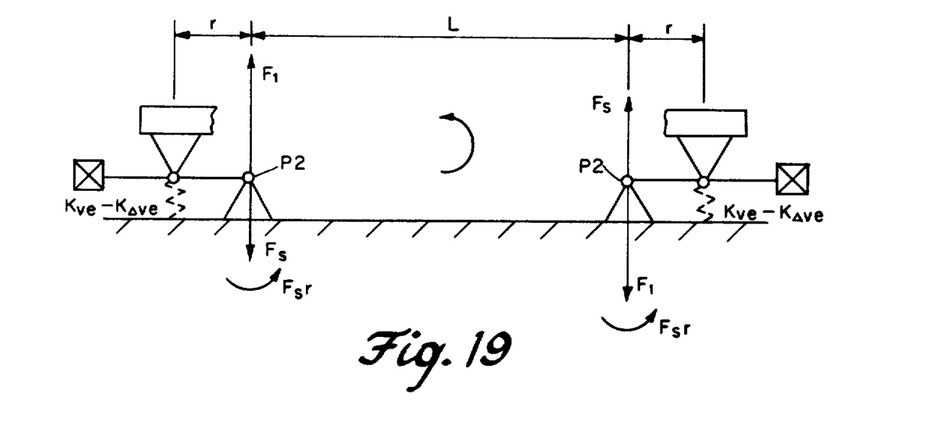
FIGS. 19 and 20 are schematic diagrams illustrating the forces applied to the body in an arrangement of the type shown in FIGS. 1-7 which is tuned to achieve antiresonance in response to angular forcing.
Figure 20:
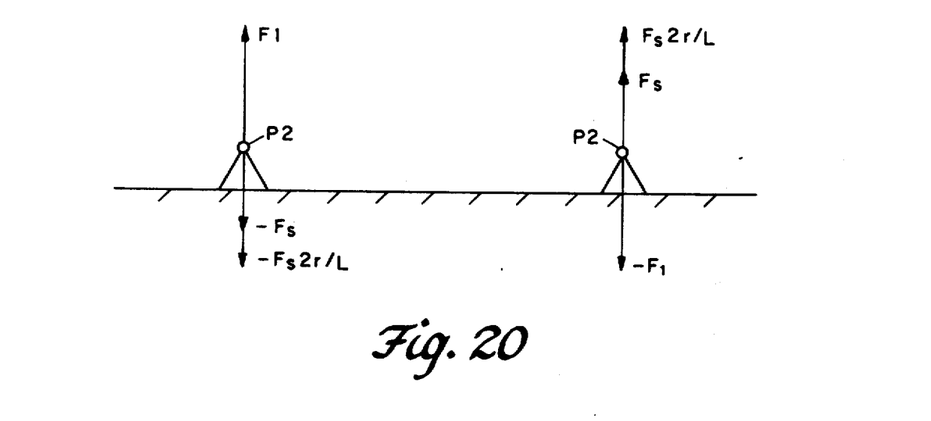

The reason for this construction is shown in FIGS. 19 and 20. The diagrams there shown illustrate that in order to achieve isolation in the angular vibration mode the linear spring force components $F_s$ must be less than the inertia forces $F_1$ since the moment $2 F_s r$ due to the spring forces is counterclockwise. This means that the spring constant of the basic spring arms 40' and 42' must be lower than the total spring constant $K_{ve}$ given in tuning equation (1). FIG. 20 shows the total force balance achieved when the $F_s r$ moments are resolved to linear forces at the pivots P2.

It can be shown that the reduction in the equivalent spring constant required for angular isolation is:

$$K_{\Delta ve} = \frac{K_{ve}}{\frac{L}{2r} + 1} \quad (4)$$

where the parameters L and r are defined as in FIG. 19. The equivalent spring constant for the spring arms alone thus becomes:

$$K_{ve(arm)} = K_{ve}\left(1 - \frac{2r}{L + 2r}\right)$$

The equivalent spring constant for the secondary spring 60 required in the FIG. 10 system is thus defined by equation (4). To convert $K_{\Delta ve}$ to a linear spring constant $K_\Delta$ the factor $2(r/N)^2$ is applied such that:

$$K_\Delta = \frac{2 K_{ve}}{\frac{L}{2r} + 1}\left(\frac{r}{N}\right)^2$$

where N is the length of the crank arms 52 (FIG. 10).

Figure 21:
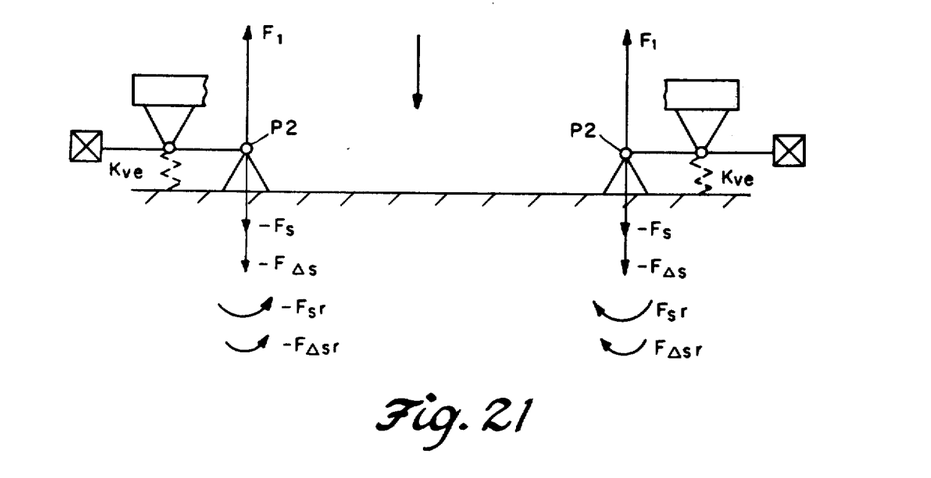
FIG. 21 is a schematic diagram similar to FIG. 19 showing the application of forces in the case of linear vibration and demonstrating how the addition of a secondary spring, such as shown in FIG. 10, alters the spring rate for linear forcing to isolate the body from moments as well as linear forces.

FIG. 21 shows the complete array of forces applied to the fuselage by the FIG. 10 system in response to linear vibration. The spring constant is $K_{ve}$ which is the summation of $K_{\Delta ve}$ and $K_{ve}$ (arm). The former contributes the spring forces $F_{\Delta s}$ and the latter contributes the spring forces $F_s$. Notice that the moments $F_s r$ and $F_{\Delta s} r$ applied at the two pivots cancel one another out. Since $|F_{\Delta s} = F_s| = |F_1|$, the system is in equilibrium and total vibration isolation is achieved at the antiresonant frequency $\omega$ defined by tuning equation (1).

It should be noted that with the apparatus oriented as shown in FIG. 1, an unisolated moment will not be present for angular vibration about the roll axis. This is because the pivot axes 16a and 22a are equidistant from the centerline of the aircraft and no offset exists between the force application points as viewed in a plane transverse to the roll axis.

Thus, in summary, it is seen that in accordance with one aspect of the invention described herein apparatus is provided for coupling a body to a vibrating mass with minimum transmission of vibration forces therebetween, such appartus including a weighted lever arm, first pivot means connecting said vibrating mass to said lever arm about a first pivot axis, and second pivot means connecting said body to said lever arm about a second pivot axis displaced along said arm from said first pivot axis, one of said pivot axes being located substantially at a first end of said lever arm. As illustrated in the exemplary embodiments hereinabove described, the vibrating mass is represented by the transmission assembly and the body of the helicopter fuselage. The weighted lever arm, may be, for example, the portions 18a, 18b, and 18c associated with the assembly 18 illustrated in connection with FIGS. 1–7.

As further illustrated in the embodiments hereinedescribed, the first pivot means may include, for example, transmission mounting bracket 16 and pivot pin 16a associated therewith, the first pivot axis being defined by the pivot pin. Furthermore, the second pivot means is illustrated, for example, by the fuselage mounting bracket 22 and its pivot pin 22a, the second pivot axis being defined by the latter. In the case of the FIG. 1 embodiment, the second pivot axis is located substantially at the aforesaid first end of the weighted lever arm.

The apparatus of the invention further includes spring arm means joined at one end to said first end of said lever arm and connected at the other end to a point of attachment anchored to said body such that the direction of flexure of said spring arm means produced by pivot motion of said lever arm is parallel to the pivot plane of said pivot arm, whereby the inertial forces imposed by said lever arm on said body through said second pivot means in response to motion of said vibrating mass at a predetermined frequency are substantially equal and opposite to the spring forces imposed on said body by flexure of said spring arm means. As embodied for example in the exemplary system described in connection with FIG. 1, the spring arm means are illustrated as the two parallel spring arms 18d. These arms are connected at one end to the bifurcated section 18c of the weighted lever arm and at the other end to a point of attachment on the pivot link 24, the latter being anchored to the fuselage structure at the pivot pin 22a, whereupon the spring arms 18d flex in vertical paths parallel to the vertical pivot plane of the arm 18b.

In accordance with a second aspect of the invention, a system is provided for isolating a body from both linear and angular vibration forces generated by a vibrating mass coupled thereto, such system including a pair of weighted lever arms coupling said vibrating mass to said body about two pivot axes on the latter, said lever arms being pivotally connected to said vibrating mass and operating in response to said vibration forces to apply inertial forces to said body at said pivot axes. As illustrated in the exemplary embodiments shown in connection with FIG. 9, the pair of weighted lever arms are shown as the arms 43' and 45' and the two pivot axes are defined by the fuselage pivot pins 22a.

As further described in connection with this aspect of the invention, spring means are provided for transmitting the vibration forces to said body through points displaced from said two pivot axes, said spring means being constructed and arranged to operate with a first spring rate in response to said linear vibration forces and to operate with a different spring rate in response to said angular vibration forces such that the spring forces applied to said body in response to linear vibration are different from the spring forces applied in response to angular vibration, the difference between said forces operating to equalize the imbalance of moments acting on said body during the latter vibration mode due to the displacement between said two pivot axes and said spring force transmission points, whereby said body is isolated from angular vibration forces as well as linear forces produced at a predetermined vibration frequency. As illustrated in the exemplary embodiment described in connection with FIG. 9, the spring means includes spring arms 44' and 46' as well as the compression spring 48, the spring rate of such spring means being determined for linear vibration by the combined spring rates of the arms 44' and 46' while the spring rate for angular vibration is determined by the combined spring rates of arms 44' and 46' and compression spring 48. As explained above, the operation of this apparatus is such that during angular vibration the linear spring force components applied to the fuselage through the fuselage pivot pins 22a are greater than the inertia forces applied by the weighted lever arms whereby the additional linear spring force increment couples a moment into the fuselage which balances the moment created due to the application of the spring forces to the fuselage through the displaced pivot axes 16a.

It will be apparent to those skilled in the art that various additional modifications and variations could be made to the embodiments of the vibration isolation system of the invention as hereinabove described without departing from the spirit and scope of the invention.

What is claimed is:

1. Apparatus for coupling a body to a vibrating mass with minimum transmission of vibration forces therebetween, comprising:
   a weighted lever arm;
   first pivot means connecting said vibrating mass to said lever arm about a first pivot axis;
   second pivot means connecting said body to said lever arm about a second pivot axis displaced along said arm from said first pivot axis, one of said pivot axes being located substantially at a first end of said lever arm; and
   spring arm means joined at one end to said first end of said lever arm and connected at the other end to a point of attachment anchored to said body such that the direction of flexure of said spring arm means produced by pivot motion of said lever arm is parallel to the pivot plane of said lever arm, whereby the inertial forces imposed by said lever arm on said body through said second pivot means in response to motion of said vibrating mass at a predetermined frequency are substantially equal and opposite to the spring forces imposed on said body by flexure of said spring arm means.

2. The apparatus of claim 1 wherein said first pivot axis is located at said first end of said lever arm.

3. The apparatus of claim 1 wherein said second pivot axis is located at said first end of said lever arm.

4. The apparatus of claim 1 wherein said weighted lever arm and said spring arm means are a single integrated member.

5. The apparatus of claim 1 wherein said other end of said spring arm means is anchored to said body through a pivot link to accommodate shortening of said spring arm means during flexure.

6. The apparatus of claim 1 wherein said weighted lever arm includes a bifurcated end section having parallel side members and said first and second pivot means comprise:
   first and second pivot pins rotatably mounted in said bifurcated end section and extending between the side members thereof whereby said vibrating mass and said body are connected to said lever arm by attachment to said first and second pivot pins, respectively, at points thereon located between said side members.

7. The apparatus of claim 6 wherein said spring arm means comprises:
   a pair of elongated spring arms extending from the parallel side members of said lever arm, said spring arms converging to form a common end member at said point of attachment to said body.

8. The apparatus of claim 7 wherein said spring arm means further includes a pivot link coupling said common end member to said body to accommodate shortening of said spring arms during flexure.

9. A vibration isolation system for connecting a body to a vibrating mass with minimum transfer of vibration therebetween comprising, in combination:
   coupling means for connecting said vibrating mass to said body at a plurality of coupling locations, said coupling means including at each of said locations:
   a weighted lever arm;
   first pivot means connecting said vibrating mass to said lever arm about a first pivot axis;
   second pivot means connecting said body to said lever arm about a second pivot axis displaced along said arm from said first pivot axis, one of said pivot axes being located substantially at a first end of said lever arm; and
   spring arm means joined at one end to said first end of said lever arm and connected at the other end to a point of attachment anchored to said body such that the direction of flexure of said spring arm means produced by pivot motion of said lever arm is parallel to the pivot plane of said lever arm, whereby the inertial forces imposed by said lever arm on said body through said second pivot means in response to motion of said vibrating mass at a predetermined frequency are substantially equal and opposite to the spring forces imposed on said body by flexure of said spring arm means.

10. The system of claim 9 wherein the first pivot axis of each weighted lever arm is located substantially at said first end of said arm.

11. The system of claim 9 wherein the second pivot axis of each weighted lever arm is located substantially at said first end of said arm.

12. The system of claim 9 wherein said weighted lever arms and associated spring arm means are grouped in pairs such that with each said pair said other ends of said spring arms are connected to points of attachment anchored to said body about the second pivot axis associated with the other weighted lever arm of said pair.

13. The system of claim 12 including a pair of pivot links coupling said other ends of said spring arm means to said second pivot axes to accommodate shortening of said spring arm means during flexure.

14. The system of claim 13 wherein said pivot links extend in opposite directions away from said second pivot axes thereby orienting the spring arm means of each related pair along substantially parallel lines.

15. The system of claim 13 wherein said pivot links extend in the same direction away from said second pivot axes thereby orienting the spring arm means of each related pair in a crossing pattern, one of said related spring arm means comprising a pair of spaced-apart elongated spring arms between which said other spring arm means passes to form said crossing pattern.

16. Apparatus for coupling a body to a vibrating means with minimum transmission of vibration forces therebetween, said vibrating mass having both a linear component of vibratory motion toward and away from said body and an angular component of vibratory motion about a vibration center displaced from said body, said apparatus comprising:

a pair of weighted lever arms;

first and second pivot means on each of said lever arms for connecting said vibrating mass and said body, respectively, to said arms at a pair of first and second pivot axes, the latter being located between the former;

first spring means for coupling said linear and angular vibratory components to said body through said first pivot axes; and second spring means constructed and arranged to couple said linear vibratory component, but not said angular vibratory component, to said body through said first pivot axes, whereby the spring forces imposed on said body through flexure of said first and second spring means and the inertial forces imposed by said lever arms in response to linear and angular vibration at a predetermined frequency mutually cancel to isolate said body from both of said vibratory components.

17. Apparatus for coupling a body to a vibrating mass with minimum transmission of vibration forces therebetween, said vibrating mass having both a linear component of vibratory motion toward and away from said body and an angular component of vibratory motion about a vibration center displaced from said body, said apparatus comprising:

a pair of weighted lever arms;

first and second pivot means on each of said lever arms for connecting said vibrating mass and said body, respectively, to said arms at a pair of first and second pivot axes, the former being located between the latter;

first spring means for coupling said linear and angular vibratory components to said body through said first pivot axes; and second spring means constructed and arranged to couple said angular vibratory component, but not said linear vibratory component, to said body through said first pivot axes, whereby the spring forces imposed on said body through flexure of said first and second spring means and the inertial forces imposed by said lever arms in response to linear and angular vibration at a predetermined frequency mutually cancel to isolate said body from both of said vibratory components.

18. The apparatus of claim 16 wherein said first spring means comprises a pair of elongated spring arms, each said arm being connected at one end to a point of attachment anchored to said body and at the other end to one of said weighted lever arms, said spring arms being connected to said respective lever arms at points thereon proximate said second pivot means.

19. The apparatus of claim 18 wherein the spring arm connected to each lever arm is anchored to said body by a pivot link attached about the second pivot axis of the other lever arm such that said spring arms are substantially parallel to one another, said pivot links functioning to accommodate shortening of said spring arms during flexure.

20. The apparatus of claim 19 wherein said second spring means comprises:

a pair of crank arms extending at substantially right angles from said respective lever arms and attached thereto at points adjacent said second pivot axes; and a spring coupled between said crank arms such that said spring is flexed in response to said linear component of vibratory motion, the latter motion pivoting said lever arms in opposite angular directions, and is not flexed in response to said angular component of vibratory motion when said lever arms pivot in the same angular direction.

21. The apparatus of claim 20 wherein said spring is a tension spring.

22. The apparatus of claim 17 wherein said first spring means comprises a pair of elongated spring arms, each said arm being connected at one end to a point of attachment anchored to said body and at the other end to one of said weighted lever arms, said spring arms being connected to said respective lever arms at points thereon proximate said first pivot means.

23. The apparatus of claim 22 wherein the spring arm connected to each lever arm is anchored to said body by a pivot link attached about the second pivot axis of the other lever arm such that said spring arms are substantially parallel to one another, said pivot links functioning to accommodate shortening of said spring arms during flexure.

24. The apparatus of claim 23 wherein said second spring means comprises a spring coupled between said spring arms, said spring flexing in response to said angular component of vibratory motion when said lever arms pivot in the same angular direction, and not flexing in response to said linear component of vibratory motion when said lever arms pivot in opposite angular directions.

25. The apparatus of claim 24 wherein said spring is a compression spring.

26. In a system for isolating a body from both linear and angular vibration forces generated by a vibrating mass coupled thereto, the combination comprising:

a pair of weighted lever arms coupling said vibrating mass to said body about two pivot axes on said body, said lever arms being pivotally connected to said vibrating mass and operating in response to said vibration forces to apply inertial forces to said body at said pivot axes; and spring means for transmitting said vibration forces to said body through points displaced from said two pivot axes, said spring means being constructed and arranged to operate with a first spring rate in response to said linear vibration forces and to operate with a different spring rate in response to said angular vibration forces such that the spring forces applied to said body in response to linear vibration are different from the spring forces applied in response to angular vibration, the difference between said forces operating to equalize the imbalance of moments acting on said body during the latter vibration mode due to the displacement between said two pivot axes and said spring force transmission points, whereby said body is isolated from angular vibration forces as well as linear forces produced at a predetermined vibration frequency.

* * * * *